Patented June 13, 1944

2,351,413

UNITED STATES PATENT OFFICE 2,351,413

METHOD OF TREATING FERMENTED LIQUORS FOR RECOVERY OF GLYCEROL

Eduard Farber, New Haven, Conn., and Victor Dayton and James S. Wallerstein, New York, N. Y., assignors to The Overly Bio-Chemical Research Foundation, Inc., New York, N. Y., a corporation of New York No Drawing. Application April 3, 1943, Serial No. 481,772

14 Claims. (Cl. 260—637)

The present invention relates to a method of increasing the yield of glycerol recovered from fermented liquors, and is directed more particularly to the treatment of the residue left after the distillation of the glycerol from such liquors, and to the recovery of further quantities of glycerol therefrom.

According to the present invention, the more or less non-volatile and insoluble residue remaining in the distillation vessel after the distillation of glycerol from fermented carbohydrate liquors is treated with steam, and then subjected to an acid treatment which effects hydrolysis and/or de-polymerization of the mass, resulting in freeing additional quantities of glycerol which can be recovered by distillation. The invention contemplates also a treatment of the re-dissolved residue with a soluble lignin derivative, that is, a soluble form of lignin, under suitably adjusted acid conditions, and at elevated temperature, whereby an effective purification is accomplished by the precipitation of nitrogenous and particularly proteinaceous matter, thereby facilitating the subsequent distillation of the glycerol and improving the degree of recovery thereof.

The most common method of recovering glycerol from fermented liquors consists in driving out the glycerol vapors with the aid of superheated steam in a chamber held under reduced pressure. For various reasons, the recovery is frequently incomplete, and appreciable quantities of glycerol are left in the heavy viscous residue after distillation. This is partly because the glycerol, particularly at neutral or alkaline pH's, tends to polymerize to form diglycerine and higher polymers and probably also condensation compounds; and partly because the presence of various impurities, particularly nitrogenous matters, impedes the heat transfer in the concentrated slops during distillation, and prevents a thorough penetration by the steam or other carrier vapor or gas. This is particularly true where the glycerol has been derived by the fermentation of grain mashes, or other mashes high in nitrogenous substances.

In our copending patent application Serial No. 481,771, entitled "Method of recovering glycerol from fermented liquors," and filed April 3, 1943, we describe a purification method prior to distillation based on acidification and lignin treatment which reduces these difficulties and improves the yields of glycerol derived on distillation. While our method herein disclosed for treating the distilled slops for an additional recovery of glycerol is particularly advantageous in securing an augmented yield where such purification has not been previously employed, even where such purifications have been carried out, appreciable secondary recoveries may be achieved.

At the end of distillation the slops consist of a viscous, blackish insoluble mass clinging to the side of the distillation vessel. In accordance with the present invention, this mass may be readily solubilized by the use of steam at ordinary pressures, and the sides of the vessel completely cleansed. To prevent dilution, it is obviously beneficial to use as little steam as possible.

The dissolved black suspension is now acidified to a pH value of about 0 to 2, for example to the vicinity of pH 0.2, and heated briefly to boiling. Under these conditions, the diglycerol or otherwise condensed glycerol will tend to be hydrolyzed or depolymerized to the simple compound. The solution is then neutralized to the vicinity of pH 4.0, at which it is distilled. Such an acidity will tend to prevent any re-polymerization or decomposition and will reduce foaming. It will also keep the concentrated mass more permeable to the steam or other vaporous or gaseous carrier used to aid distillation. The distillation can be carried out in various ways, but spraying downward into a counter-current of superheated steam in a distillation chamber maintained under the highest possible vacuum appears to be the most favorable. The conditions of the distillation process in all respects resemble that applied to the original glycerol concentrates, and the glycerol derived is of similar purity. Such acid hydrolysis, and redistillation of the solubilized residues, may be applied not only to fermentation liquors, but to all residues from which glycerol has been distilled, as for example, soap lyes, and synthetic mixtures.

The recovery process may be further improved by a lignin purification of the redissolved residues of the original distillation, as described in our copending patent application cited above. To this end an appropriate quantity of a water-soluble form of lignin is added to the dissolved residue, the mixture adjusted to within the pH range of about 0 to 3, if it is not already so, and heated briefly to a gentle boil, and the resulting precipitate filtered or centrifuged off. Thereafter the residues can be reconcentrated and distilled in the usual manner. The elimination of nitrogenous matters thus precipitated makes possible a greater glycerol concentration, and brings about a better heat transfer, and greater permeability to steam in the course of distillation. Such a purification procedure is particularly advantageous in the case of grain mashes, or in other cases where appreciable nitrogenous matters are present. Even where the residue to be distilled has been derived from a mash previously purified by the lignin and acidification treatment, a second lignin treatment of the distillation residues was found advantageous for further glycerol recoveries, where all the nitrogenous matter had not yet been eliminated, although such a purification procedure is particularly advantageous in respect to yield increase where no such pre-purification has previously been carried out, and where the concentration of the residual nitrogenous matter is apt to be of a higher order.

Such a purification procedure may be applied with good results not only to the residues of distilled fermentation liquors, but to all residues containing organic nitrogenous materials, and especially soluble proteins, from which glycerol has been distilled.

We have found that a combination of lignin purification and acid hydrolysis, carried out in the manner described above, brings about higher yields than either procedure alone.

The water-soluble form of lignin employed in the preliminary purification (where such purification is followed) is one which can be made to precipitate within a more or less acid pH range and under conditions which will not unfavorably affect the condition or recovery of the glycerol contained in the mixture. A commercially available form of water-soluble lignin derivative is the sulfite waste liquor either in its crude original form, or in the concentrates which are obtained by neutralizing it to about pH=6 to 7 and evaporating water from the original dilute sulfite waste liquor. Another form of such lignin derivative can be prepared, for instance, by precipitating the so-called black liquor obtained in the alkaline cooking of wood by adding a mineral acid as, for example, hydrochloric, sulfuric, nitric, etc. The precipitated lignin preparation may then be re-dissolved in alkali and thereby obtained in a purer form. Still another form is produced when lignin of any source is at least partially chlorinated and extracted with water. As described in our above-mentioned application, when a solution containing lignin sulfonic acid in the form of its calcium, sodium, or other soluble salt is added to a solution containing nitrogenous matter, the solution being at elevated temperature and preferably in the vicinity of the boiling point, a precipitation takes place. This precipitate is soluble in alkali and strong acid but less soluble or insoluble at moderately low acidities in the vicinity of pH=0 to 3. It is therefore advantageous to adjust the solution to such relatively low acidity in order to obtain not only the greatest amount of precipitate, but also the best form of it as regards the ease of its removal from the solution.

The ligneous matter precipitating within the pH range above disclosed carries with it not only the higher molecular weight, nitrogenous bodies of the order of the proteins, and their immediate hydrolytic decomposition products, but also nitrogen compounds of lower molecular weight; and apparently also other impurities are carried down, by adsorption. The purification is of such high degree that the difficulties heretofore encountered in the distillation of glycerol are in large part or from the practical standpoint even completely eliminated, so that the process of recovery is facilitated and the yield improved.

The amount of lignin sulfonic acid necessary to produce a precipitate containing a substantial part of the nitrogen-containing matter formerly dissolved with the carbohydrates, is small. In general, it is sufficient to add so much of the lignin solution that about one part by weight of lignin sulfonic acid is present for about one part by weight of proteinaceous or nitrogenous matter. In pràctice, an excess over this proportion may be employed but it is preferred that it be small, so that under the acid conditions not only is the proteinaceous matter removed in the best form for separation, but the amount of impurities introduced with the lignin sulfonic acid solution which are not precipitated under these conditions is insignificant. Some of these impurities will consist in sulfite salts; others in carbohydrates, either of the hexose or of the pentose type.

This treatment is particularly advantageous when the glycerol is prepared by fermentation of sugars derived by the hydrolysis of wheat, corn, and other grain, where large amounts of nitrogenous matter are present, and all previously cited difficulties are particularly marked.

The process involving broadly the purification of glycerol-containing liquors with a water-soluble lignin derivative followed by distillation of the glycerol under acid conditions is claimed in our copending application above referred to; in the present application such process is claimed only in combination with the re-solubilization of the insoluble mass remaining after the distillation of glycerol from a liquor of any origin.

Our procedure will be described in more detail in the following example which is presented only by way of illustration:

*Example*

The distilled slop of a fermented wheat mash is removed from the walls and bottoms of the distillation chamber by means of steam and forms a black colloidal suspension containing about 30% solids, which is drawn off into a separate vessel. Perhaps one-tenth of the solids consists of proteinaceous matter, and there are both undistilled glycerol and polymerized glycerol contained within the slops. The pH of the suspension is adjusted to 0–1.0 with sulfuric acid, and lignin sulfonic acid in an amount in excess of the proteinaceous matter present is added. The solution is heated close to boiling for a period of one hour. During this time, the remaining proteinaceous matter forms an insoluble compound with the lignin sulfonic acid and separates in heavy dark flocs. The polymerized glycerol present in the slops is depolymerized or otherwise decomposed to the monomeric form. Thereafter the solution is adjusted to about pH 4.0 by means of lime, filtered, and concentrated to about 50% solids. The concentrated slops are then redistilled and more than 80% of the total glycerol in the slops is recovered. In a parallel redistillation carried out without such repurification and hydrolysis of the same mash, recovery is less than half as much.

The pH value of the glycerol solution being distilled should be, as above explained, in the acid range. With certain mashes, too high an acidity is undesirable, and often leads to resinification. The optimum pH value for all mashes cannot be stated because it depends on numerous variables, such as the origin of the mash or liquor, the concentration of glycerol, the nature of the impurities, etc. In general, however, a pH range of 3 to 5 will give best results.

We claim:

1. A method of increasing the yield in the recovery of glycerol by distillation, which comprises acid hydrolyzing the non-volatile residue obtained after distilling out glycerol from a liquor containing the same, and re-distilling the residue after neutralization of the surplus acid.

2. A method of increasing the yield in the recovery of glycerol from fermented liquors, which comprises acid hydrolyzing the non-volatile residue obtained after distilling out glycerol from such a liquor, and re-distilling the residue after neutralization of the surplus acid.

3. A method of increasing the yield in the recovery of glycerol from fermented grain mashes, which comprises acid hydrolyzing the non-volatile residue obtained after distilling out glycerol from such a mash, and re-distilling the residue after neutralization of the surplus acid.

4. A method of increasing the yield in the recovery of glycerol by distillation, which comprises acid hydrolyzing the non-volatile residue obtained after distilling out glycerol from a liquor containing the same, treating the solution so obtained with a water-soluble form of lignin, and re-distilling the solution after neutralization of the surplus acid.

5. A method of increasing the yield in the recovery of glycerol from fermented liquors, which comprises acid hydrolyzing the non-volatile residue obtained after distilling out glycerol from such a liquor, treating the solution so obtained with a water-soluble form of lignin, and redistilling the solution after neutralization of the surplus acid.

6. A method of increasing the yield in the recovery of glycerol from fermented grain mashes, which comprises acid hydrolyzing the non-volatile residue obtained after distilling glycerol from such a mash, treating the solution so obtained with a water-soluble form of lignin, and redistilling the solution after neutralization of the surplus acid.

7. A method of increasing the yield in the recovery of glycerol from solutions containing the same, comprising acidifying the non-volatile residue obtained after the distillation of a glycerol solution to a pH value of approximately 0.2, heating the solution, partially neutralizing the liquid, and thereafter distilling glycerol therefrom.

8. A method of increasing the yield in the recovery of glycerol from solutions containing the same, comprising subjecting the insoluble residue obtained after the distillation of a glycerol solution to the action of steam, acidifying the solution so obtained, and thereafter distilling glycerol therefrom under acid conditions.

9. A method of increasing the yield in the recovery of glycerol from solutions containing the same, which comprises subjecting the insoluble residue obtained after the distillation of a glycerol solution to the action of steam, acidifying the solution so obtained to a pH value of about 0.2, heating the solution to boiling, partially neutralizing the solution to a pH value of about 4.0, and thereafter distilling out the glycerol.

10. A method of increasing the yield in the recovery of glycerol from solutions containing the same, which comprises subjecting a residue obtained after the distillation of a glycerol solution to the action of a solution of a water-soluble form of lignin, under acid conditions, heating the mixture to promote precipitation, removing the precipitate, and distilling glycerol from the acidified liquor.

11. A method of increasing the yield in the recovery of glycerol from solutions containing the same, which comprises subjecting an insoluble residue obtained after the distillation of a glycerol solution to the action of steam, mixing the solution so obtained with a water-soluble form of lignin at a pH value below 3, heating the mixture to promote precipitation, separating the liquor from the precipitate, partially neutralizing the liquor to a pH value of about 4, and thereafter distilling out glycerol under the acid conditions.

12. Method according to claim 11, wherein the soluble form of lignin is a sulfite waste liquor.

13. Method according to claim 11, wherein the solution is concentrated after separation from the precipitate.

14. Method according to claim 1, wherein the gylcerol is distilled by spraying the acidified liquor downward into a countercurrent of superheated steam in vacuo.

EDUARD FARBER.
VICTOR DAYTON.
JAMES S. WALLERSTEIN.